United States Patent [19]
Sircar

[11] Patent Number: 6,065,534
[45] Date of Patent: May 23, 2000

[54] ALUMINUM ALLOY ARTICLE AND METHOD OF USE

[75] Inventor: Subhasish Sircar, Richmond, Va.

[73] Assignee: Reynolds Metals Company, Richmond, Va.

[21] Appl. No.: 09/081,452

[22] Filed: May 19, 1998

[51] Int. Cl.[7] .................................................. F28F 9/04
[52] U.S. Cl. ......................... 165/178; 165/905; 148/439; 420/530; 420/536
[58] Field of Search .................................. 165/178, 905; 228/183; 29/890.054; 420/53; 428/653

[56] References Cited

U.S. PATENT DOCUMENTS

| | | |
|---|---|---|
| 4,005,243 | 1/1977 | Baba et al. . |
| 4,244,756 | 1/1981 | Tanabe et al. ............................ 428/544 |
| 4,471,032 | 9/1984 | Fukuoka et al. ......................... 428/653 |
| 4,617,172 | 10/1986 | Mori . |
| 4,857,267 | 8/1989 | Maki et al. ............................... 419/31 |
| 5,122,208 | 6/1992 | Alabi ....................................... 148/440 |
| 5,282,909 | 2/1994 | Ara et al. . |
| 5,286,445 | 2/1994 | Kamiya .................................... 420/530 |
| 5,375,760 | 12/1994 | Doko ........................................ 228/183 |
| 5,511,603 | 4/1996 | Brown et al. . |
| 5,522,950 | 6/1996 | Bartges et al. . |
| 5,525,294 | 6/1996 | Tanaka et al. . |
| 5,573,608 | 11/1996 | Miyake et al. . |
| 5,580,402 | 12/1996 | Fujita et al. . |
| 5,587,029 | 12/1996 | Sircar ....................................... 148/438 |
| 5,744,255 | 4/1998 | Doko et al. ............................. 428/654 |
| 5,771,965 | 6/1998 | Inaba et al. ............................. 165/178 |
| 5,810,949 | 8/1998 | Chakrabarti et al. ................... 148/535 |

*Primary Examiner*—Leonard Leo
*Attorney, Agent, or Firm*—Alan M. Biddison

[57] ABSTRACT

An aluminum alloy article consisting essentially of controlled amounts of iron, silicon, copper, manganese, magnesium, titanium, zinc, zirconium and free machining elements with the balance being aluminum and incidental impurities is adapted for use as a connector block in a heat exchanger assembly. The connector block has a connector block body with at least one machined portion therein and is configured to be brazed to a portion of the heat exchanger, particularly the heat, exchanger header. The aluminum alloy combines the properties of machinability, corrosion resistance, strength and brazeability. A connector block made from the aluminum alloy can be machined to the right configuration and can be brazed to the heat exchanger header to form a high quality brazed joint. In addition, the connector block can withstand the corrosive environment associated with the heat exchanger and has the necessary mechanical properties to interface with other heat exchanger components.

28 Claims, 1 Drawing Sheet

ALUMINUM ALLOY ARTICLE AND METHOD OF USE

FIELD OF THE INVENTION

The present invention is directed to an aluminum alloy article and a method of use and, in particular, to a heat exchanger component which combines machinability and brazeability and a method of brazing the article after machining.

BACKGROUND ART

In the prior art, the use of aluminum alloys in heat exchanger applications is well known. Aluminum alloys are used for heat exchanger headers, tubing, fins and connector blocks. Typically, the connector blocks are brazed to the header to facilitate the hookup of fluid supply and takeaway lines of a system requiring fluid cooling, e.g., an air conditioning system.

When manufacturing the heat exchanger assemblies, the components are often clamped together and furnace brazed using either clad materials, filler brazing materials or a combination of both.

One significant problem that occurs during the manufacturing of the assembly is the formation of an inferior brazing joint between the connector block and the heat exchanger header. Prior to brazing, the connector blocks are often machined and combined with fasteners to facilitate connection to the fluid supply or takeaway lines. Because of the physical property requirements associated with the machining and the fastener use, prior art connector blocks are usually made from AA6000 series aluminum alloys. These types of aluminum alloys exhibit poor machinability and are not easily brazed by the CAB brazing process due to their high magnesium content. Consequently, it is often difficult to obtain a high quality brazed joint between the connector block and another component of a heat exchanger assembly. Utilizing a more brazeable alloy such as a standard or commercial AA3000 series alloy does not present an acceptable alternative as a material for connector block use. The AA3000series alloys, while being brazeable, are generally too soft to adequately machine or have the necessary mechanical properties to facilitate mechanically fastening the connector block to other components.

As such, a need has developed to provide an improved connector block for heat exchanger application. In response to this need, the present invention provides an improved aluminum alloy article or connector block which combines both machinability and brazeability. The inventive aluminum alloy article also has mechanical properties making it suitable for use as a heat exchanger connector block and has adequate corrosion resistance. The aluminum alloy article also facilitates the brazing process when assembling the heat exchanger components together.

SUMMARY OF THE INVENTION

Accordingly, it is a first object of the present invention to provide an aluminum alloy article exhibiting machinability and brazeability.

Another object of the present invention is to provide an aluminum alloy article having good corrosion resistance and mechanical properties.

A still further object of the present invention is to provide a method of brazing the aluminum alloy article as part of assembling heat exchanger components together.

One other object of the present invention is to provide a heat exchanger assembly using the aluminum alloy article as a component thereof.

Other objects and advantages of the present invention will become apparent as a description thereof proceeds.

In satisfaction of the foregoing objects and advantages, the present invention provides an aluminum alloy article comprising a body having at least one machined portion, the body being an aluminum alloy consisting essentially of, in weight percent, an amount of silicon up to about 0.2%, an amount of iron up to about 0.7%, an amount of copper up to about 0.5%, between about 0.1 and 1.8% manganese, from essentially zero magnesium to an amount up to about 0.5%, up to about 0.4% chromium, up to about 0.4% zinc, up to about 0.2% zirconium, an amount of titanium between about 0.03 and 0.4%, at least one of the free machining elements of bismuth and tin or a compound thereof in an amount up to about 1.5% with the balance being aluminum and incidental impurities.

The alloy composition has more preferred limits wherein the silicon ranges between 0.01 and 0.15%, the iron ranges between 0.01 and 0.5%, the copper ranges between 0.01 and 0.4%, the manganese ranges between 0.2 and 1.7%, the magnesium is from zero up to 0.4%, an amount of chromium is up to 0.2%, an amount of zinc is up to 0.25%, an amount of zirconium is up to 0.3%, titanium ranges between 0.03 and 0.3%, and an amount of at least one of tin and bismuth is up to 1.3%. Even more preferred limits are described below.

The article can include more than one machined portion and fasteners secured thereto to facilitate hooking the passageway(s) to fluid supply and takeaway lines. The machined portion can comprise one or more passageways into or through the article.

The invention also comprises the article in combination with a heat exchanger assembly wherein the assembly has cooling tubes, fins, headers and fluid supply and takeaway lines.

A further aspect of the invention includes an improved brazing process wherein the inventive article is brazed to a heat exchanger component using a flux. The article permits effective brazing with minimal amounts of flux.

BRIEF DESCRIPTION OF THE DRAWINGS

Reference is now made to the drawings of the invention wherein.

DESCRIPTION OF THE PREFERRED EMBODIMENTS

Figure 3:
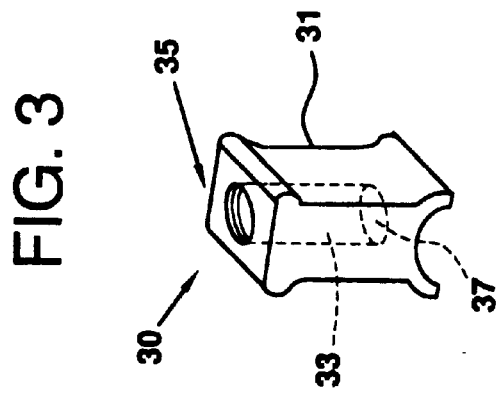
FIG. 3 shows another embodiment of the inventive connector block.

The present invention offers significant improvements in the field of heat exchangers, heat exchanger components, aluminum alloys for use as one or more heat exchanger components and brazing methods. The invention overcomes the dilemma facing heat exchanger component manufacturers and assemblers when machinability, strength, corrosion resistance and brazeability are all needed in one application.

The aluminum alloy article of the invention is ideally suited as a heat exchanger component that is machined, brazed, subjected to corrosive environments and subjected to mechanical forces for mechanical attachment to other heat exchanger components. One component particularly adapted as the inventive aluminum alloy article is a connector block that links the inlet and outlet of a heat exchanger to cooling fluid supply and takeaway lines. These connector blocks are often extruded shapes and require machining operations to form one or more passageways therein as well as other recesses or configurations in the connector block body like o-ring seals and seats with good surface finish to prevent leakage. Although the connector blocks can be extruded, they could also be forged or subjected to other forms of hot deformation to form the desired shape.

Having the combined properties of machinability, brazeability, strength and corrosion resistance in an aluminum alloy article is unexpected when compared with known prior art alloys exhibiting only some of the desired properties. For example, machinable alloys such as standard or commercial AA6262 have poor brazeability. Brazeable alloys such as standard or commercial AA3000 series alloys do not have the strength nor machinability for use as a connector block in a heat exchanger application.

The properties of machinability, brazeability, strength and corrosion resistance are related to the aluminum alloy used to make the inventive article. In one aspect, the alloy has controlled amounts of iron, silicon, copper, manganese, chromium, zinc and titanium. The term "amount" is intended to mean a finite amount of the named alloying element in a specified percentage which is deemed to be greater than percentages normally classified as incidental impurities in aluminum alloys. Another aspect of the alloy composition includes controlled levels of magnesium wherein the alloy may be either magnesium-free or may include a defined magnesium amount. In yet another aspect, at least one of bismuth and tin are included in amounts effective to provide the enhanced machinability without the loss of the other properties, particularly mechanical properties. Ranges of the various elements are detailed below in terms of broad and more narrow limits.

In its broadest embodiment, the inventive aluminum alloy consists essentially of, in weight percent, the following composition: an amount of silicon up to about 0.2%, an amount of iron up to about 0.7%, an amount of copper up to about 0.5%, between about 0.1 and about 1.8% manganese, from essentially zero magnesium to an amount up to about 0.5%, up to about 0.4% chromium, up to about 0.4% zinc, up to about 0.2% zirconium, an amount of titanium between about 0.03 and about 0.4%, and at least one of the free machining elements of bismuth and tin or a compound thereof in an amount effective to improve the machinability of the alloy with the balance being aluminum and incidental impurities. Each of tin and bismuth amounts can range up to about 1.5%. All percentages below are in weight percent unless otherwise noted and ranges include the term "about."

A preferred embodiment of the inventive alloy further defines certain elements of the composition wherein silicon ranges between 0.01 and 0.15%, iron ranges between 0.01 and 0.5%, copper ranges between 0.01 and 0.4%, manganese ranges between 0.2 and 1.7%, magnesium is from zero to up to 0.4%, an amount of chromium is up to 0.2%, an amount of zinc is up to 0.25%, an amount of zirconium is up to 0.3%, titanium ranges between 0.03 and 0.3%, and an amount of at least one of tin and bismuth is up to 1.3%.

In a more preferred embodiment of the invention, silicon ranges between 0.03 and 0.12%, iron ranges between 0.03 and 0.4%,, copper ranges between 0.03 and 0.4%, manganese ranges between 0.5 and 1.6%, magnesium is from zero to up to 0.35%, an amount of chromium is up to 0.1%, titanium ranges between 0.03 and 0.2%, and an amount of one or both of tin and bismuth ranges between 0.1 and 1.0%.

An even more preferred embodiment defines an alloy wherein silicon is between 0.03 and 0.09%, iron ranges between 0.03 and 0.15%, copper ranges between 0.2 and 0.4%, manganese is between 1.0 and 1.6%, titanium ranges between 0.1 and 0.2%, and when using one or both of tin and bismuth, each ranges between 0.1 and 0.85%. The ranges or amounts of one embodiment can be replaced or substituted with the ranges or amounts of another embodiment. More specific embodiments are identified in Table I wherein the ALLOYS include the listed elements with the balance being aluminum and incidental impurities.

TABLE I

| ALLOY | Si | Fe | Cu | Mn | Mg | Cr | Ni | Zn | Ti | Bi | Sn | Zr |
|---|---|---|---|---|---|---|---|---|---|---|---|---|
| A | .16 | .60 | .09 | 1.07 | <.01 | .27 | <.01 | .03 | .04 | <.01 | <.01 | .10 |
| B | .12 | .14 | .27 | 1.38 | .17 | .19 | <.01 | .03 | .04 | <.01 | <.01 | .10 |
| C | .10 | .10 | .28 | 1.47 | .22 | .19 | <.01 | .03 | .05 | 1.05 | <.01 | .10 |
| D | .10 | .10 | .29 | 1.42 | .17 | .19 | <.01 | .03 | .04 | <.01 | .74 | .10 |
| E | .17 | .63 | .08 | 1.17 | <.01 | .27 | <.01 | .03 | .05 | .79 | <.01 | .10 |
| F | .16 | .61 | .09 | 1.13 | <.01 | .27 | <.01 | .03 | .04 | <.01 | .74 | .10 |
| G | .20 | .69 | .29 | 1.53 | .08 | .20 | <.01 | .02 | .04 | <.01 | <.01 | <.01 |
| H | .19 | .66 | .28 | 1.36 | .08 | .17 | <.01 | .03 | .03 | .80 | <.01 | <.01 |
| I | .20 | .65 | .29 | 1.41 | .09 | .18 | <.01 | .03 | .04 | <.01 | .79 | <.01 |
| J | .20 | .64 | .29 | 1.40 | .10 | .17 | <.01 | .03 | .04 | .69 | .47 | <.01 |
| K | .20 | .66 | .29 | 1.38 | .08 | .17 | <.01 | .03 | .04 | .38 | .34 | <.01 |
| L | .06 | <0.1 | 0.3 | 1.50 | <0.01 | <0.01 | <.01 | 0.025 | .15 | 0.8 | <.01 | .10 |
| M | .06 | <0.1 | 0.3 | 1.50 | <0.01 | <0.01 | <.01 | 0.025 | .15 | 0.47 | 0.36 | .10 |
| N | .06 | <0.1 | 0.3 | 1.50 | <0.01 | <0.01 | <.01 | 0.025 | .15 | <.01 | 0.8 | .10 |

The inventive alloy is particularly useful as a connector block for use in a heat exchanger application, e.g., a condenser. The connector block is made from the inventive alloy and has at least one passageway having an inlet and an outlet for the passage of fluid through the connector block and to or from the heat exchanger. The connector block can have more than one inlet and outlet or passageway depending on the particular heat exchanger design and application. For example, the connector block could have a connector block body having one inlet passageway interconnecting a source of inlet fluid and the heat exchanger, and a second outlet passageway directing fluid from an outlet of the heat exchanger to outlet tubing downstream of the connector block. The connector block can also have threaded studs extending from the connector block body, the studs interfacing with another body or connector that is used to facilitate attachment of fluid supply and takeaway lines to the connector block. The studs can also provide structural support for the heat exchanger, e.g., attach a condenser to the frame of an automobile.

Figure 1:
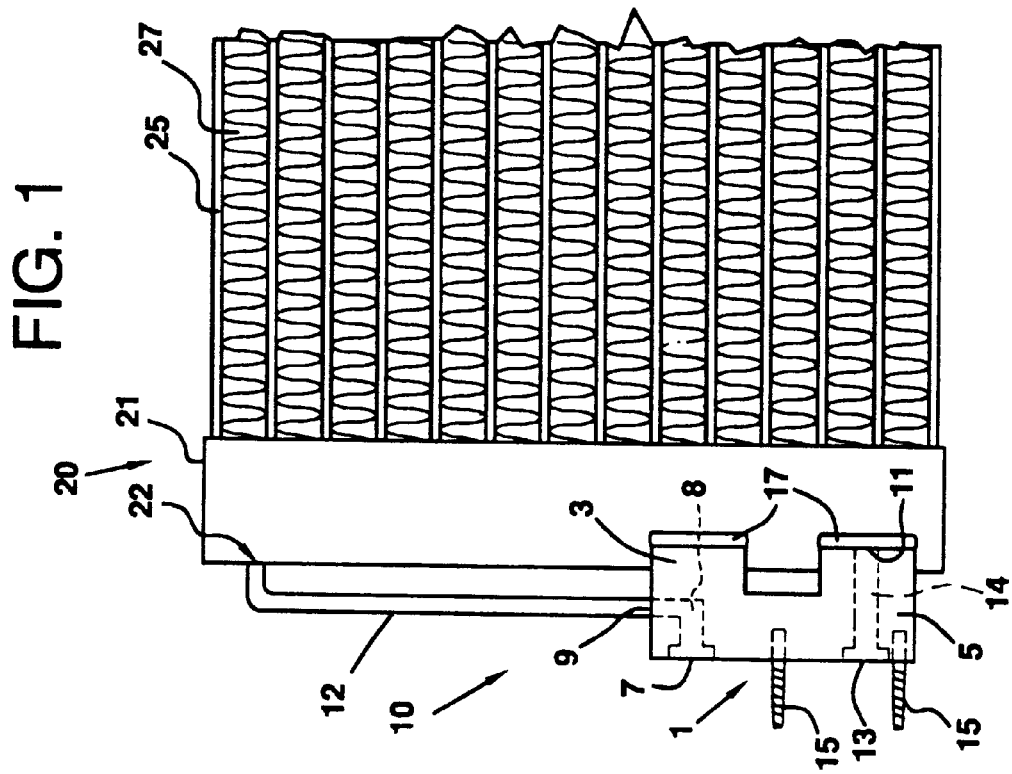
FIG. 1 is a partial schematic drawing showing a heat exchanger assembly with an exemplary connector block.
Figure 2:
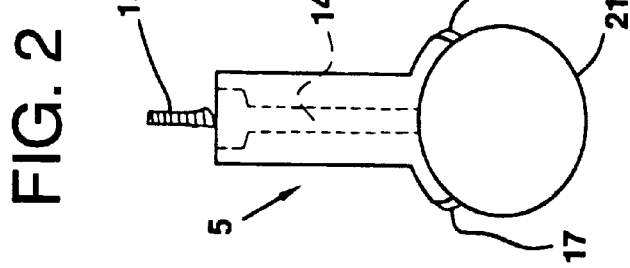
FIG. 2 is an end view of the assembly of FIG. 1.

FIGS. 1 and 2 illustrate an exemplary connector block 10 in combination with a heat exchanger 20. The heat exchanger 20 is illustrated with one header 21 (the other header not shown), cooling tubing 25 and fins 27. Although not shown, the header 21 has internal baffles to direct the fluid passing through the tubing 25 on its journey through the entire heat exchanger for the proper cooling.

The connector block 10 has a connector block body 1 divided into an inlet portion 3 and an outlet portion 5. The inlet portion 3 has an inlet opening 7 and an outlet opening 9 defining a passageway 8, the opening 9 aligned with an opening 22 in the header 21 of the heat exchanger 20 via the tubing 12. Fluid enters inlet 7, passes through the inlet portion 3 and into the header 21 via the tubing 12 for cooling.

The outlet portion 5 has an inlet 11 and an outlet 13 defining a passageway 14, the inlet 11 in communication with an opening (not shown) in the header 21. Cooled fluid exits the header 21 and passes through the outlet portion 5 by entering the inlet 11 and exiting the outlet 13 to begin another fluid cycle, e.g., a refrigeration cycle.

The connector block body 1 is shown with a pair of threaded studs 15, each stud threaded into a complementary threaded bore in the body 1. The studs are used to align and attach a mating connector (not shown) which can hook up fluid supply and takeaway lines to the connector block 10 or provide structural support, e.g., attach the heat exchanger to an adjacent structure. It should be understood that other connector block configurations can be utilized with the alloy of the invention. For example, a separate connector block could be used for each inlet to the header and the header outlet. The connector block could be designed without the need for tubing 12 or could have different studs or other attachment devices to facilitate connector block hookup to either of the inlet or outlet tubing of a system requiring fluid cooling.

The connector block passageways 8 and 14 are formed by machining the connector block body 1. The passageways can also include lips, steps, threads or other machined configurations as deemed necessary to interface with heat exchanger components or other fasteners, connectors or the like.

FIG. 3 shows another connector block configuration designated by the reference numeral 30 and having a body 31 with a machined passageway 33 therethrough. The passageway 33 has a first opening 35 and a second opening 37, the opening 37 designed to align with an opening in a header. Depending on the direction of flow of fluid through the passageway 33, one of the openings, either 35 or 37, is an inlet and the other becomes an outlet. Although passageways are depicted in FIGS. 1–3, the inventive article could be formed with one or more passageways therein by an operation other than machining, e.g., extrusion or the like. In this instance, the article may then be subjected to machining a portion thereof to meet final dimensional tolerances, finishes or the like. Again, other configurations can be utilized providing that the article is need of some degree of machining.

With reference back to FIG. 1, the connector block is shown with brazed portions 17 wherein the connector block is secured to the header 21 for a fluid-tight fit. The connector block 10 can be brazed to the heat exchanger by any known techniques, but furnace brazing is preferred. The appropriate cladding material or filler metal, e.g., an AA4000 series aluminum-silicon filler metal, can be used as part of the brazing process. Using the inventive alloy for the connector block 10 permits a low level of flux to be used during the brazing cycle, thereby reducing flux consumption and cost. For example, when brazing a prior art AA6000 series connector block to a heat exchanger, the amount of flux required can be as high as 100 to 200 g/m$^2$ of flux, wherein m$^2$ represents the area to be brazed and g is the weight in grams of flux. Even with these levels of flux, the resultant braze using prior art connector blocks can still include porosity within the brazed joint or stitching, i.e., intermittent porosity pockets where the filler metal joins the materials being brazed together.

In contrast to the undesirable brazeability of the prior art alloys commonly employed for connector blocks, the connector block of the invention is highly brazeable. Further, brazing can be successfully done, i.e., a joint without porosity, stitching or the like, using flux levels ranging up to 50 g/m$^2$, more preferably 3–20 g/m$^2$ and as low as 4 to 5 g/m$^2$. The low level of magnesium in the inventive alloy minimizes the formation of magnesium compounds such as magnesium oxide or flouride. Magnesium oxide forms during the brazing process and can be difficult to remove from the brazed area, thereby compromising the integrity of the braze. Magnesium flouride, a high melting point compound, can be formed by interaction with a flourine-containing flux, such formation also interfering with the brazing process.

The inventive alloy connector block, while having acceptable brazeability, also has the desired machinability and strength to permit the connector block to be machined and connected to various other components. The connector block is typically formed by first casting an aluminum alloy into a cast shape. The cast shape is then processed as is known in the art to form a shape suitable for extrusion, forging or other hot deformation operation. The shape is then hot deformed, for example, extruded, into an elongated workpiece. The hot deformed workpiece is cut into pieces of selected length. These pieces are then machined to form the desired passageways, contours, recesses, seats, threads or whatever other configurations are necessary so that the connector block can interface with a heat exchanger, a tubing connector or other components related thereto or a combination thereof.

The extruded connector block should have the machinability to enable the necessary passageways and the like to be formed therein. The inventive alloy combines machinability without the loss of the necessary strength and ductility for connector block use. To demonstrate the unique properties of the connector block material, various alloy compositions were tested for machinability. The machining tests, using an AA6061 aluminum alloy as a base alloy for comparison purposes, turned one inch diameter bars downed to 0.900 inch in one pass on a lathe. Sample bars were turned on a lathe, running at 2000 RPM with a feed rate of 0.021 inches per minute and a cut depth of 0.050 inches, and using a carbide tool, for approximately 8 inches in length. A second test was conducted wherein the samples were drilled using a ¼ inch drill bit, the bit run at 2000 RPM and the same feed rate as stated above. The drilled hole extended about one inch into each sample. No chip breaker or coolant was used in either test.

As can be seen from Table II, Alloys C–F and H–K all exhibited desirable machining properties, i.e., small chip or small curl-shaped machining debris. Alloys D, F and I–K showed particularly impressive machining capabilities. The alloys showing desirable machining properties also exhibited acceptable strength properties. For example, comparing Alloy B with Alloy C, Alloy C has significantly better machinability with comparable strength and elongation values. A comparison between Alloy G with Alloys H–K reveals a similar finding. These comparisons demonstrate that the alloys of the invention provide the necessary machinability without compromising the mechanical properties needed when using the alloy in a connector block application.

between the two different materials thereby causing the materials to separate from each other upon application of the machining force. This separation results in void formation. Further interaction causes coalescing of the voids which then results in material being separated from the workpiece, i.e., chip formation, during machining.

TABLE II

| ALLOY | UTS (KSI) | YS (KSI) | % ELONG. | Machining Debris (turning) | | Machining Debris (Drilling) | | Machining Element(s) |
|---|---|---|---|---|---|---|---|---|
| | | | | SIZE | SHAPE | SIZE | SHAPE | |
| A | 22.8 | 17.3 | 33.5 | long strings | thickened | two long chips | compacted strings | none |
| B | 27.9 | 19.9 | 28.5 | long strings | thickened ragged | two long strings | strings | none |
| C | 26.4 | 19.1 | 30.0 | | | small/ medium chips | chips/ strings | Bi |
| D | 27.7 | 21.1 | 20.0 | small | single curls | small | chips | Sn |
| E | 23.5 | 15.7 | 31.5 | small | chips/curls | | | Bi |
| F | 24.0 | 15.2 | 29.0 | very small | chips | very small | chips | Sn |
| G | 27.4 | 19.5 | 26.5 | long/ stringy | stringy | two long chips | compacted strings | none |
| H | 25.3 | 17.7 | 28.5 | small | chips with some compacting | long strings | strings | Bi |
| I | 26.2 | 17.6 | 20.0 | small | chips | very small | chips | Sn |
| J | 26.1 | 18.7 | 23.5 | small | curls | very small | chips | Sn, Bi |
| K | 26.5 | 20.5 | 25.5 | small | curls | small | chips | Sn, Bi |
| 6061 | | | | medium length curls short curls | | small/ medium | broken chips/some strings | |

One of the more important strength requirements for the connector block is the ability to withstand the application of a torque. In many applications, threaded studs are attached to the connector block body by threading them into complementary threaded bores. The threaded studs are then used to attach a connector block connector that may hold the fluid supply and takeaway lines together or facilitate attachment to a support member. Thus, the connector block body must be able to receive the studs without stud stripping during installation. In one application, the studs may be subjected to approximately 40–60 inch pounds of torque force during installation and must withstand approximately 200 inch pounds of force without stripping.

Alloys A, E and F were tested for torque strength to demonstrate that they had the requisite strength to meet the connector block specification outlined above. A tapped bore, i.e., 8 mm diameter × 1.25 mm pitch, was formed in each alloy sample. The sample was held in a vise and threaded studs were torqued into the bore using a calibrated torque load of 48 inch pounds (5.4 Nm). No failures occurred. The torque was raised to a maximum of 200 inch pounds (22–23 Nm). No thread failure occurred, thereby showing that the inventive alloys still had the necessary strength to meet the connector block torque specifications.

The free machining elements of bismuth and tin can improve machinability via three different mechanisms. First, when a free machining element is used alone, the element exists in the matrix of the alloy material as an individual dispersoid. When the material is being machined and a tool contacts a locale containing one or more of the dispersoids, the matrix material and the dispersoids flow differently with respect to each other. A mismatch of displacement occurs Second, when at least two free machining elements are used, e.g., bismuth and tin, a low melting point compound can be formed in the matrix. With this low melting point compound present in the alloy, a local increase in the alloy temperature due to machining of an article made from the alloy brings the low melting point compound to a soft or liquid state. In this state, the low melting point compound loses its strength thereby facilitating the formation of small machining debris such as one or more chips. The chips can then be easily removed from the machining area without interfering with the machining operation.

Third, since the free machining elements are relatively low melting point materials, elemental melting or softening can occur during machining. This phenomenon can occur particularly when the machining operation is severe so as to cause a significant temperature rise in the workpiece. The melting or softening of the free machining elements causes the same effect as described above for low melting point compounds to enhance chip formation.

The inventive alloy also exhibits corrosion resistance which is required for materials for use in heat exchanger applications as evidenced by excellent corrosion test results in SWAAT testing as described in ASTM G85 Annex 3. Even better corrosion resistance can be achieved by utilizing the inventive composition when controlling titanium levels between 0.07 and 0.3%, more preferably 0.1 and 0.2%, see Alloys L, M and N in Table I.

The comparisons and test work described above demonstrate that the aluminum alloy article of the invention can be machined, subjected to the application of torquing forces and brazed to form part of a heat exchanger assembly. Further, the brazing operation can be performed at flux levels significantly lower than methods presently used in the prior art.

While a connector block is illustrated as one type of a heat exchanger article requiring machining, corrosion resistance, strength and brazeability, other articles or components requiring the same properties can be made with the compositions described above.

As such, an invention has been disclosed in terms of preferred embodiments thereof which fulfill each and every one of the objects of the present invention as set forth above and provides a new and improved aluminum alloy article useful as a heat exchanger component, as part of a heat exchanger assembly and in a method of brazing.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. An aluminum alloy article comprising a body having at least one machined portion therein, the body being an aluminum alloy consisting essentially of, in weight percent, an amount of silicon up to about 0.2%, an amount of iron up to about 0.7%, an amount of copper up to about 0.5%, between about 0.1 and 1.8% manganese, from essentially zero magnesium to an amount up to about 0.5%, up to about 0.4% chromium, up to about 0.4% zinc, up to about 0.3% zirconium, an amount of titanium between about 0.03 and 0.4%, and bismuth as a free machining element in an amount of up to about 1.5%, with the balance being aluminum and incidental impurities.

2. The article of claim 1, wherein the silicon ranges between 0.01 and 0.15%, the iron ranges between 0.01 and 0.5%, the copper ranges between 0.01 and 0.4%, the manganese ranges between 0.2 and 1.7%, the magnesium is from zero to up to 0.4%, an amount of chromium is up to 0.2%, an amount of zinc is up to 0.25%, an amount of zirconium is up to 0.2%, titanium ranges between 0.03 and 0.3%, and the amount of bismuth is up to 1.3%.

3. The article of claim 2, wherein the silicon ranges between 0.03 and 0.12%, the iron ranges between 0.03 and 0.4%, the copper ranges between 0.03 and 0.4%, the manganese ranges between 0.5 and 1.6%, the magnesium is from zero to up to 0.35%, the amount of chromium is up to 0.1%, the titanium ranges between 0.03 and 0.2%, and the bismuth ranges between 0.1 and 1.0%.

4. The article of claim 3, wherein the silicon is between 0.03 and 0.09%, the iron ranges between 0.03 and 0.15%, the copper ranges between 0.2 and 0.4%, the manganese is between 1.0 and 1.6%, the titanium ranges between 0.1 and 0.2%, and the bismuth ranges between 0.1 and 0.85%.

5. The article of claim 1, wherein the body has at least one machined passageway therethrough.

6. The article of claim 5, wherein the body has a plurality of machined passageways therethrough.

7. The article of claim 1, wherein at least one threaded stud extends from the body.

8. The article of claim 1, wherein titanium ranges between 0.07 and 0.3% to enhance corrosion resistance as measured using ASTM G85 Annex 3.

9. The article of claim 8, wherein titanium ranges between 0.1 and 0.2%.

10. In a heat exchanger assembly having a plurality of cooling tubes interconnected between a pair of headers, adjacent cooling tubes separated by fins, and at least one connector block having at least one machined portion therein and being brazed to one of the headers so that the at least one passageway of the connector block is in communication with one of an inlet and an outlet of one of the headers, the improvement comprising the at least one connector block being formed of an aluminum alloy consisting essentially of, in weight percent, an amount of silicon up to about 0.2%, an amount of iron up to about 0.7%, an amount of copper up to about 0.5%, between about 0.1 and 1.8% manganese, from essentially zero magnesium to an amount up to about 0.5%, up to about 0.4% chromium, up to about 0.4% zinc, up to about 0.3% zirconium, an amount of titanium between about 0.03 and 0.4%, at least one of the free machining elements of bismuth and tin and a compound thereof in an amount of up to about 1.5%, with the balance being aluminum and incidental impurities.

11. The assembly of claim 10, wherein the silicon ranges between 0.01 and 0.15%, the iron ranges between 0.01 and 0.5%, the copper ranges between 0.01 and 0.4%, the manganese ranges between 0.2 and 1.7%, the magnesium is from zero to up to 0.4%, the amount of chromium is up to 0.2%, the amount of zinc is up to 0.25%, the amount of titanium ranges between 0.03 and 0.3%, and the amount of at least one of tin and bismuth is up to 1.3%.

12. The assembly of claim 11, wherein the silicon ranges between 0.03 and 0.12%, the iron ranges between 0.03 and 0.4%, the copper ranges between 0.03 and 0.4%, the manganese ranges between 0.5 and 1.6%, the magnesium is from zero to up to 0.35%, the amount of chromium is up to 0.1%, the titanium ranges between 0.03 and 0.2%, and the amount of at least one of tin and bismuth ranges between 0.1% and 1.0%.

13. The assembly of claim 12, wherein the silicon ranges between 0.03 and 0.09%, the copper ranges between 0.2 and 0.4%, the manganese is between 1.0 and 1.6%, the titanium ranges between 0.1 and 0.2%, and the at least one of bismuth and tin ranges between about 0.1 and 0.85%.

14. The assembly of claim 11, wherein the connector block has at least one machined passageway therethrough.

15. In a method of brazing a connector block to a header of a heat exchanger using a flux, wherein the connector block has at least machined portion therein, the improvement comprising forming the connector block of an aluminum alloy consisting essentially of, in weight percent, an amount of silicon up to about 0.2%, an amount of iron up to about 0.7%, an amount of copper up to about 0.5%, between about 0.1 and 1.8% manganese, from essentially zero magnesium to an amount up to about 0.5%, up to about 0.4% chromium, up to about 0.4% zinc, up to about 0.3% zirconium, an amount of titanium between about 0.03 and 0.4%, at least one of the free machining elements of bismuth and tin or a compound thereof in an amount of up to about 1.5% with the balance being aluminum and incidental impurities.

16. The method of claim 15, wherein the silicon ranges between 0.01 and 0.15%, the iron ranges between 0.01 and 0.5%, the copper ranges between 0.01 and 0.4%, the manganese ranges between 0.2 and 1.7%, the magnesium is from zero to up to 0.4%, an amount of chromium is up to 0.2%, an amount of zinc is up to 0.25%, an amount of zirconium is up to 0.2%, titanium ranges between 0.03 and 0.3%, and an amount of at least one of tin and bismuth is up to 1.3%.

17. The method of claim 16, wherein the silicon ranges between 0.03 and 0.12%, the iron ranges between 0.03 and 0.4%, the copper ranges between 0.03 and 0.4%, the manganese ranges between 0.5 and 1.6%, the magnesium is from zero to up to 0.35%, the amount of chromium is up to 0.1%, the titanium ranges between 0.03 and 0.2%, and the at least one of tin and bismuth ranges between 0.1 and 1.0%.

18. The method of claim 17, wherein the silicon is between 0.03 and 0.09%, the iron ranges between 0.03 and 0.15%, the copper ranges between 0.2 and 0.4%, the manganese is between 1.0 and 1.6%, the titanium ranges between 0.1 and 0.2%, and the at least one of tin and bismuth ranges between 0.1 and 0.85%.

19. The method of claim 15, wherein the flux is applied in an amount of up to 50 grams of flux per square meter of area to be brazed.

20. The method of claim 19, wherein the flux amount is up to 20 g/m$^2$.

21. The method of claim 20, wherein the brazing is furnace brazing.

22. An aluminum alloy article comprising a body having at least one machined portion therein, the body being an aluminum alloy consisting essentially of, in weight percent, an amount of silicon up to about 0.2%, an amount of iron up to about 0.7%, an amount of copper up to about 0.5%, between about 0.1 and 1.8% manganese, from essentially zero magnesium to an amount up to about 0.5%, up to about 0.4% chromium, up to about 0.4% zinc, up to about 0.2% zirconium, an amount of titanium between about 0.03 and 0.4%, and a free machining compound of tin and bismuth in an amount of up to about 1.5%, with the balance being aluminum and incidental impurities.

23. The article of claim 22, wherein the silicon ranges between 0.01 and 0.15%, the iron ranges between 0.01 and 0.5%, the copper ranges between 0.01 and 0.4%, the manganese ranges between 0.2 and 1.7%, the magnesium is from zero to up to 0.4%, an amount of chromium is up to 0.2%, an amount of zinc is up to 0.25%, an amount of titanium ranges between 0.03 and 0.3%, and the amount of the compound of tin and bismuth is up to 1.3%.

24. The article of claim 23, wherein the silicon ranges between 0.03 and 0.12%, the iron ranges between 0.03 and 0.4%, the copper ranges between 0.03 and 0.4%, the manganese ranges between 0.5 and 1.6%, the magnesium is from zero to up to 0.35%, an amount of chromium is up to 0.1%, the titanium ranges between 0.03 and 0.2%, and the amount of the compound of tin and bismuth ranges between 0.1 and 1.0%.

25. The article of claim 24, wherein the silicon ranges between 0.03 and 0.09%, the iron ranges between 0.03 and 0.15%, the copper ranges between 0.2 and 0.4%, the manganese ranges between 1.0 and 1.6%, the titanium ranges between 0.1 and 0.2%, and the amount of the compound of tin and bismuth ranges between 0.1 and 0.85%.

26. The article of claim 22, wherein the body has at least one machined portion therethrough.

27. The article of claim 26, wherein the body has a plurality of machined passageways therethrough.

28. The article of claim 22, wherein at least one threaded stud extends from the body.

* * * * *